E. ZIPPER.
CLOTH MEASURING AND CUTTING MACHINE.
APPLICATION FILED DEC. 8, 1906.
990,026.
Patented Apr. 18, 1911.
12 SHEETS—SHEET 3.
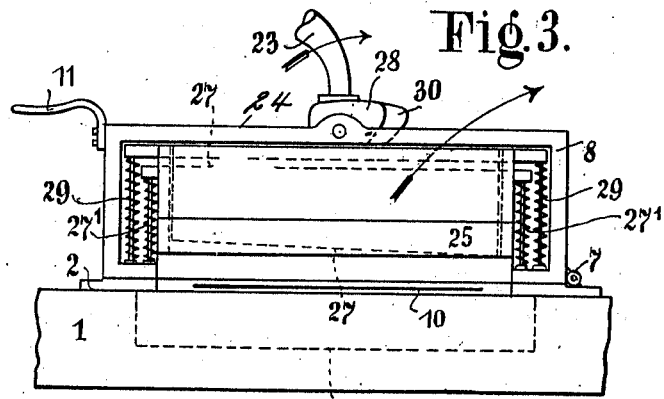
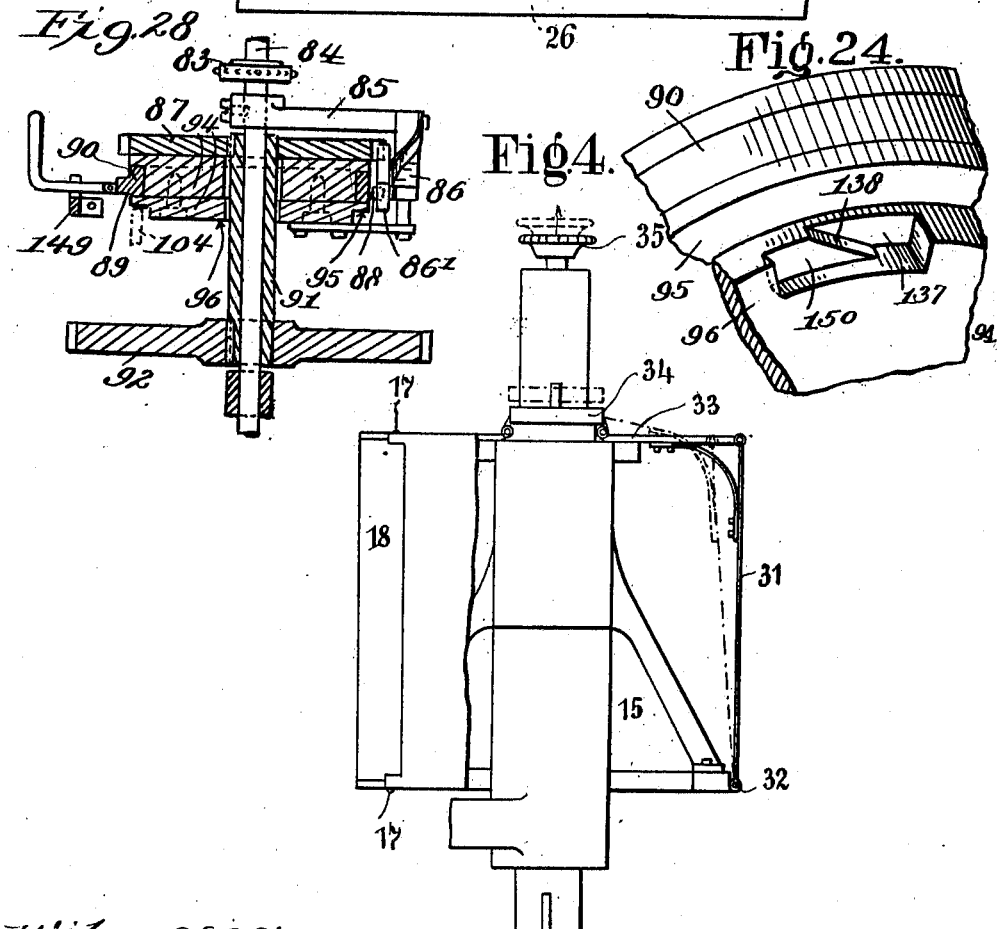
Witnesses:
Robert Everett,
Leo Kesler
Inventor
Emil Zipper
By
James L. Norris
Atty.

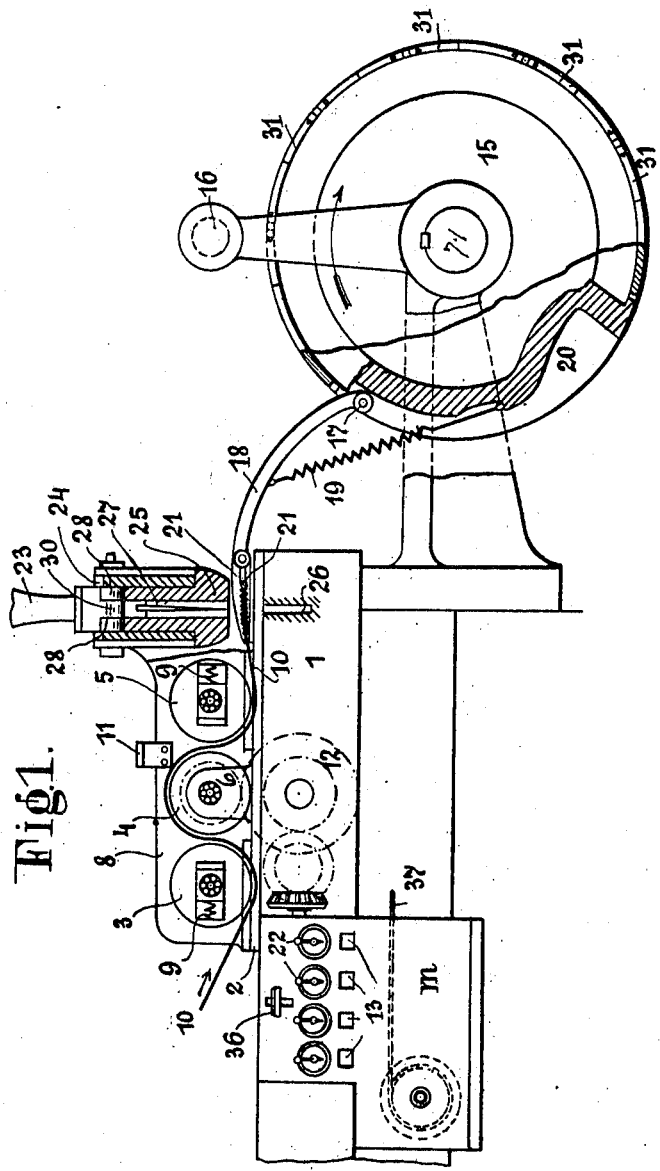

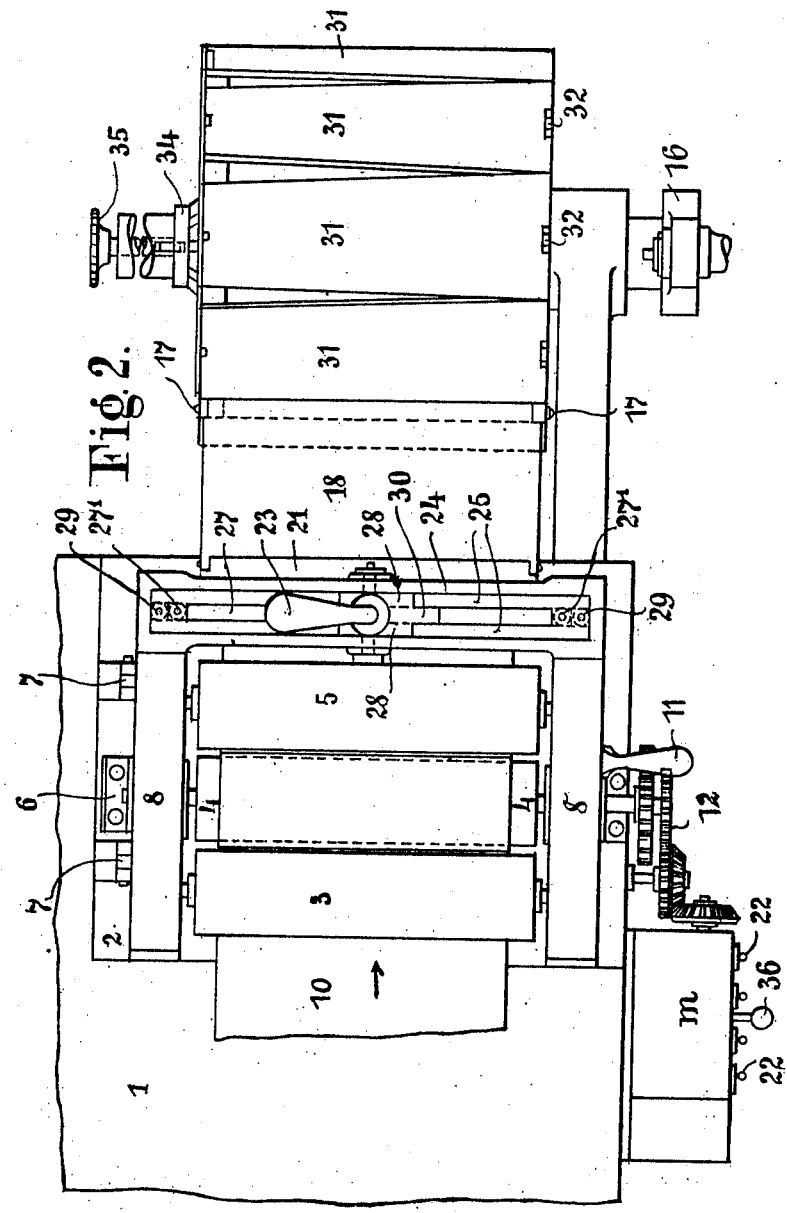

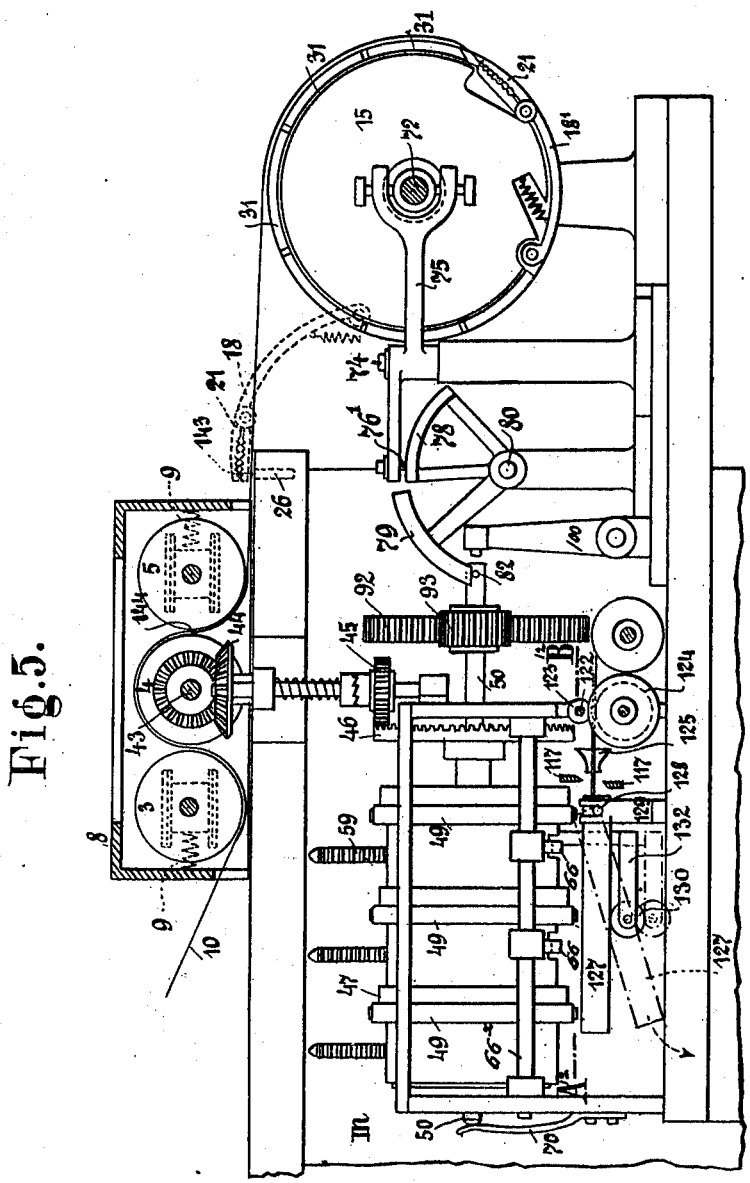

E. ZIPPER.
CLOTH MEASURING AND CUTTING MACHINE.
APPLICATION FILED DEC. 8, 1906.

990,026.

Patented Apr. 18, 1911.
12 SHEETS—SHEET 5.

Witnesses:
Robert Everett.
Ed. Kesler

Inventor
Emil Zipper
By
James L. Norris.
Atty.

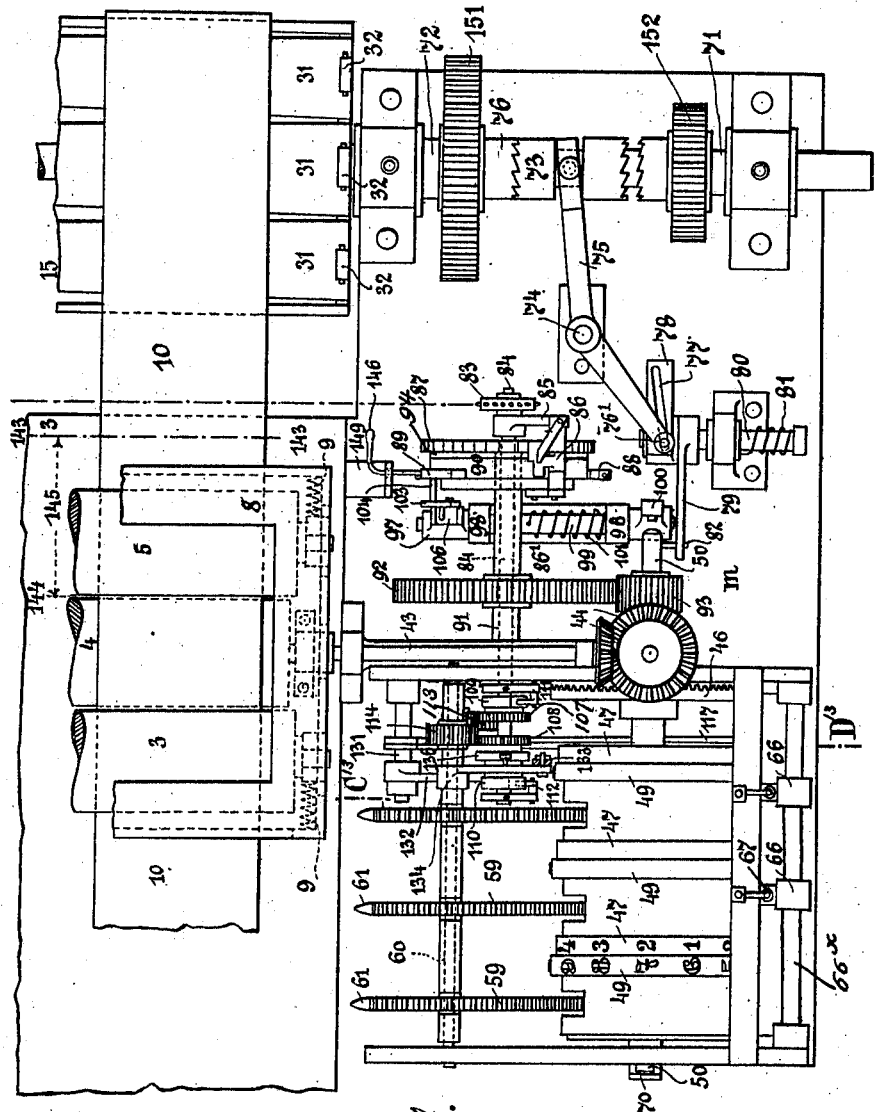

E. ZIPPER.
CLOTH MEASURING AND CUTTING MACHINE.
APPLICATION FILED DEC. 8, 1906.
990,026.
Patented Apr. 18, 1911.
12 SHEETS—SHEET 7.
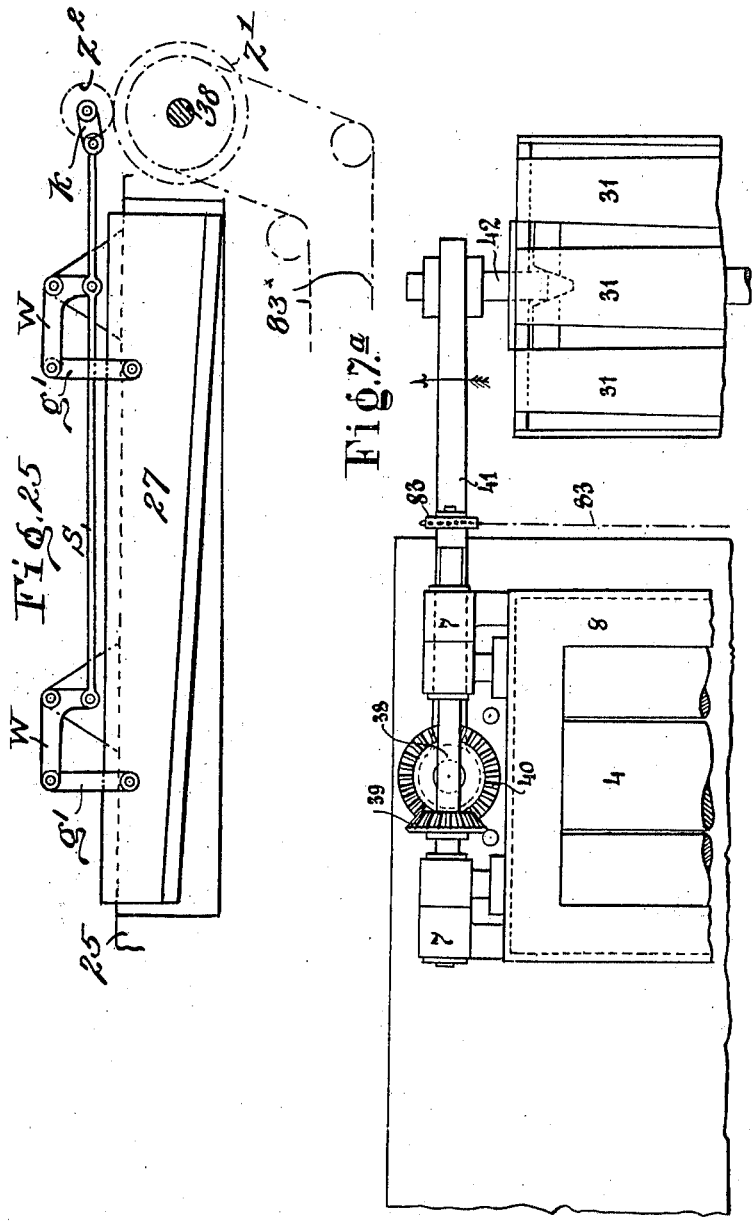

E. ZIPPER.
CLOTH MEASURING AND CUTTING MACHINE.
APPLICATION FILED DEC. 8, 1906.

990,026.

Patented Apr. 18, 1911.
12 SHEETS—SHEET 8.

Witnesses:
Robert Everett
C. D. Kesler

Inventor
Emil Zipper
By
James L. Norris.
Atty

E. ZIPPER.
CLOTH MEASURING AND CUTTING MACHINE.
APPLICATION FILED DEC. 8, 1906.

990,026.

Patented Apr. 18, 1911.
12 SHEETS—SHEET 9.

Witnesses:

Inventor
Emil Zipper
By
James L. Norris.
Atty.

THE NORRIS PETERS CO., WASHINGTON, D. C.

E. ZIPPER.
CLOTH MEASURING AND CUTTING MACHINE.
APPLICATION FILED DEC. 8, 1906.
990,026.
Patented Apr. 18, 1911.
12 SHEETS—SHEET 10.
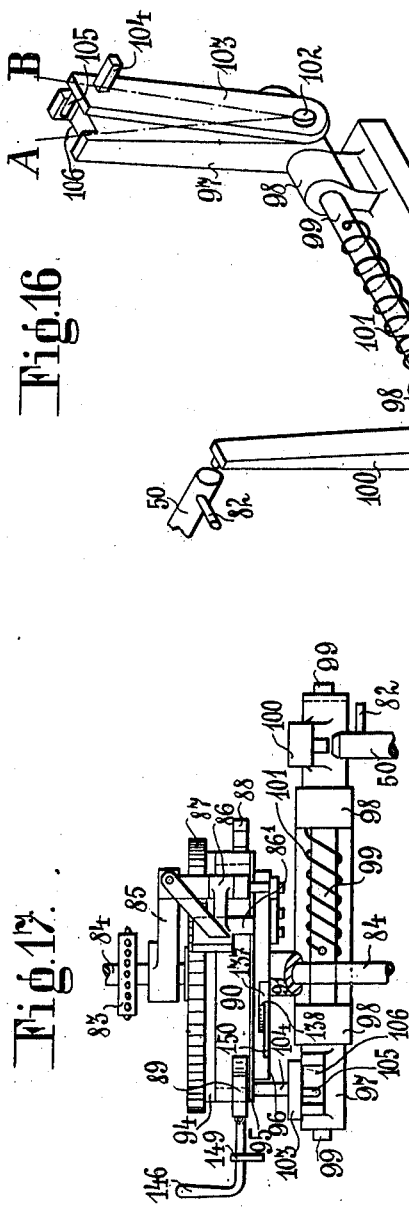
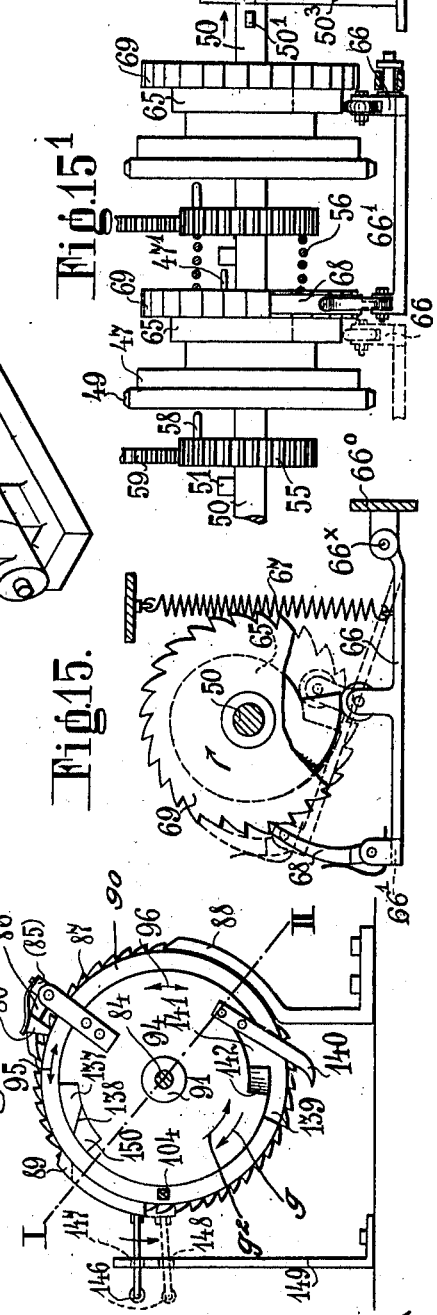
Witnesses:
Inventor
Emil Zipper
by James L. Norris
Atty

E. ZIPPER.
CLOTH MEASURING AND CUTTING MACHINE.
APPLICATION FILED DEC. 8, 1906.

990,026.

Patented Apr. 18, 1911.

12 SHEETS—SHEET 11.

Witnesses

Inventor
Emil Zipper
By
James L. Norris
Atty

E. ZIPPER.
CLOTH MEASURING AND CUTTING MACHINE.
APPLICATION FILED DEC. 8, 1906.

990,026.

Patented Apr. 18, 1911.
12 SHEETS—SHEET 12.

Witnesses:

Inventor
Emil Zipper
By
James L. Norris
Atty.

UNITED STATES PATENT OFFICE.

EMIL ZIPPER, OF VIENNA, AUSTRIA-HUNGARY.

CLOTH MEASURING AND CUTTING MACHINE.

990,026.  Specification of Letters Patent. Patented Apr. 18, 1911.

Application filed December 8, 1906. Serial No. 346,977.

*To all whom it may concern:*

Be it known that I, EMIL ZIPPER, a subject of the Emperor of Austria-Hungary, residing at Vienna, Austria-Hungary, have invented certain new and useful Improvements in Cloth Measuring and Cutting Machines, of which the following is a specification.

This invention relates to apparatus for measuring the lengths of pieces unrolled from bales or rolls of drapery goods or for drawing off the desired length from a bale or roll of such goods, rolling up the length of material measured off from the bale or roll, and cutting it off.

Apparatus according to this invention comprises measuring mechanism having a system of rollers serving for the actuation thereof and between which the material is fed, a winding drum operated by hand or by mechanical means which may be electrically operated and provided with means for seizing the loose end of the material, and cutting off mechanism arranged between the winding drum and the system of rollers and which cuts off the length of material which is unwound from the bale or roll and wound on the drum.

Figure 6:
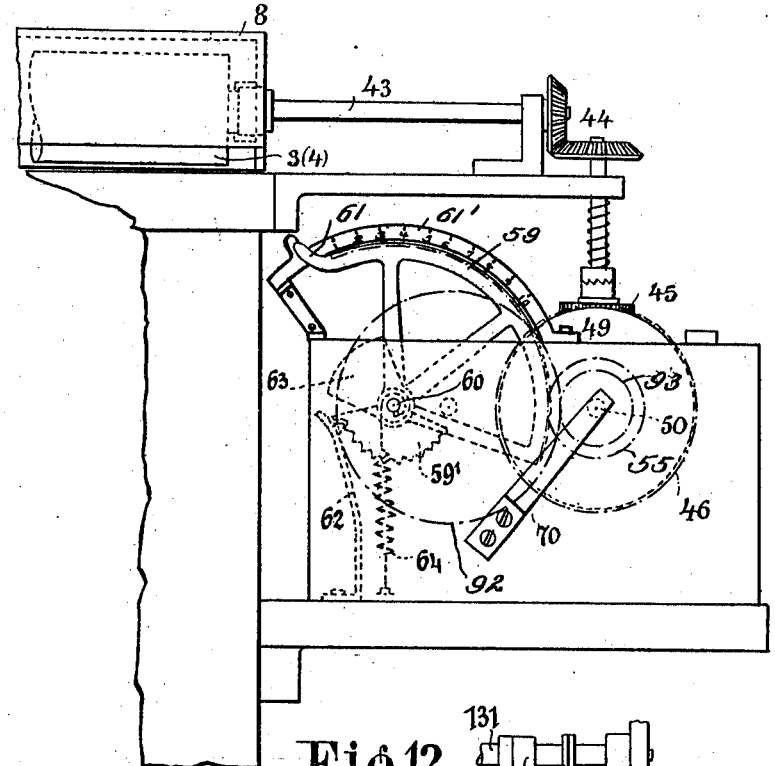
Figure 12:
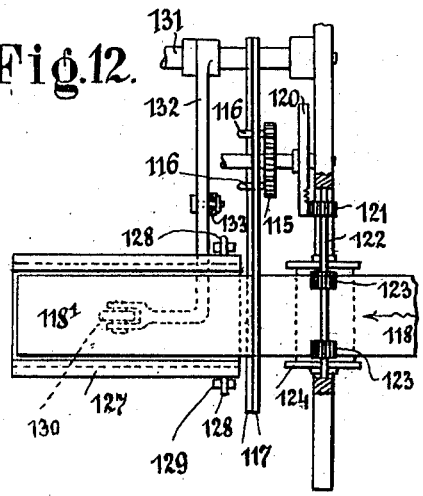
Figure 13:
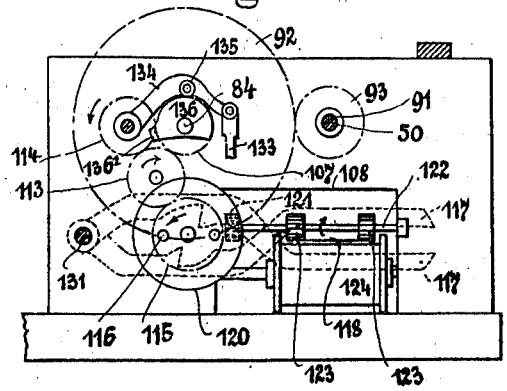
Figure 14:
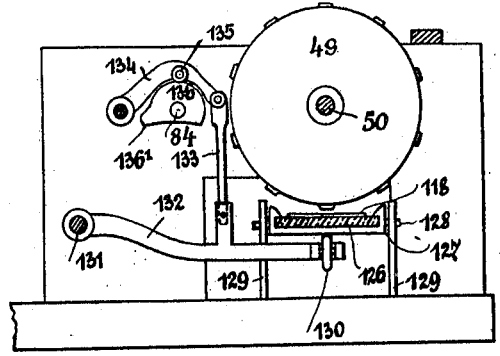
Figure 19:
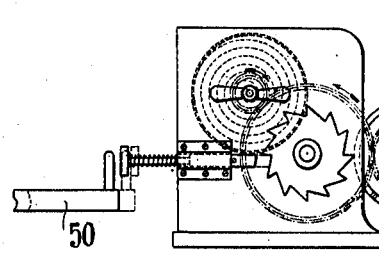
Figure 20:
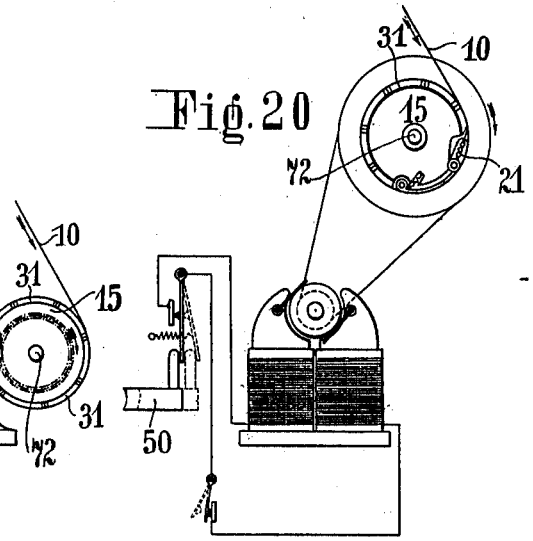
Figure 22:
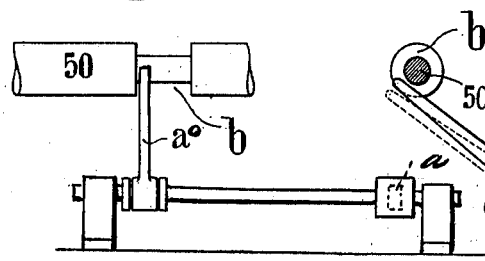
Figure 21:
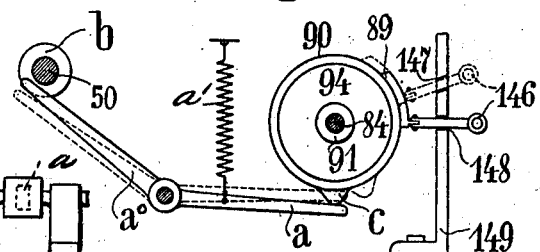
Figure 23:
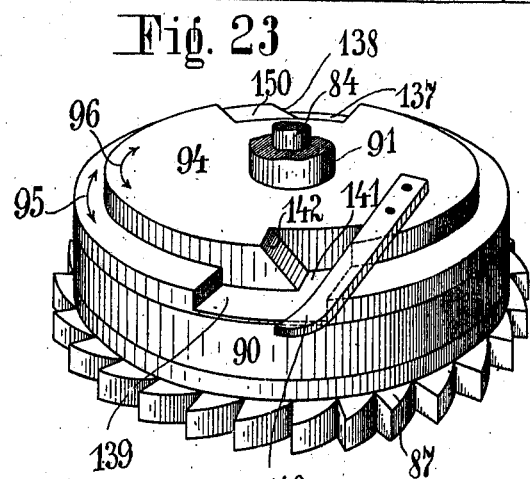
Figure 26:
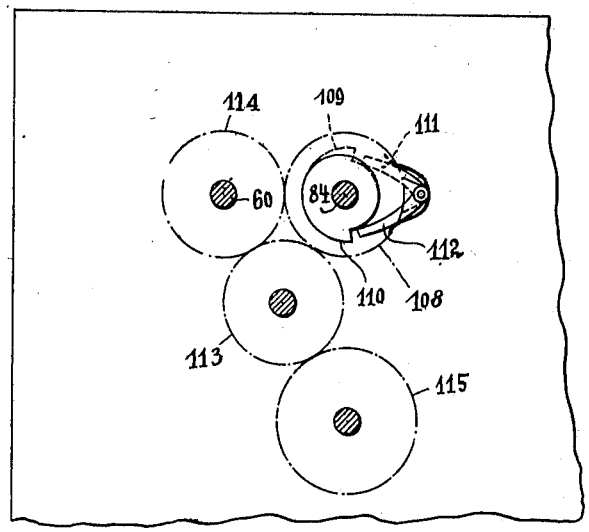
Figure 27:
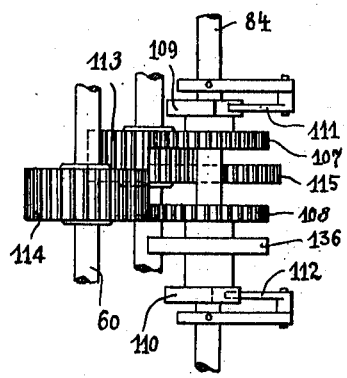

In the drawings: Figure 1 shows an elevation of one construction of apparatus embodying the features of the invention. Fig. 2 is a top plan view of the apparatus. Fig. 3 is a front elevation of the cutting off mechanism. Fig. 4 is a view in plan, partially in horizontal section showing the winding drum. Fig. 5 is a view partly in elevation and partly in vertical section showing another construction of measuring off and winding apparatus according to the features of this invention, the cutting off mechanism being omitted. Figs. 6 and 7 show in left-hand end elevation and in plan the apparatus illustrated by Fig. 5. Fig. 7$^a$ is a detail view completing the part of the mechanism shown by Fig. 7. Figs. 8, 9, 10 and 11 are sectional views showing four different working positions of the counting mechanism, of which, however, only two groups of wheels are shown, which for instance may be the units and tens groups. Fig. 12 is a horizontal section taken in the plane of the line $A^{12}$—$B^{12}$, Fig. 5. Fig. 13 is a transverse vertical section taken in the plane of the line $C^{13}$—$D^{13}$ of Fig. 7. Fig. 14 is a view similar to Fig. 13 showing certain parts which are omitted from the latter figure for the sake of clearness. Fig. 15 diagrammatically illustrates the tens shifting mechanism of the counting apparatus. Fig. 15′ illustrates a detail elevation partially in section of locking means for the counting mechanism. Fig. 16 is a perspective view of the operating mechanism for the bar for the escapement and for returning the counting mechanism to its zero position. Figs. 17 and 18 show in plan and elevation, respectively, the assembled ratchet and cam devices which operate the shifting mechanism as well as the mechanism for cutting off, printing and ejecting the checking strip and which also effects the rotation of the bar for returning the counting mechanism to its zero position. Fig. 19 shows an arrangement for mechanically driving the winding drum. Fig. 20 shows another arrangement for electrically driving the winding drum. Figs. 21 and 22 show in section and left-hand side elevation respectively means for limiting the stroke of the nose rod. Figs. 23 and 24 illustrate detail perspective views of the combined ratchet wheel and cam disk. Fig. 25 illustrates one mode of mechanically operating the cutting off mechanism. Figs. 26 and 27 show in sectional diagram and plan view a turning and reversing gear actuating the feeding device for a paper strip to be printed and cut into checking coupons. Fig. 28 is a sectional view showing more in detail the assemblage of the ratchet and cam devices which form the subject of Figs. 17 and 18.

Similar characters of reference are employed to indicate corresponding parts in the several views.

Referring to Figs. 1 to 3, the numeral 1 designates a plate upon which is mounted a standard 2 carrying three rollers 3, 4, and 5 arranged alongside one another. The center roller 4 of the three rollers rests in fixed bearings 6 of the said standard 2, and the two outer rollers 3 and 5 are carried in bearings in an upper part 8 of the standard which is connected by hinges 7 to the part 2 so that it can be swung upwardly. The rollers 3 and 5 are pressed against the center roller 4 by springs 9 acting upon the spindle bearings. Between the three rollers the loose end 10 of the piece of material to be measured off is led in the manner shown in Fig. 1, to effect which the upper part 8 of the standard is swung upwardly by the handle 11, after which and subsequent to disposition of the loose end 10 of the material upon the center roller 4 the upper part 8 of the standard is lowered. The outer rollers 3 and 5 then press the material with sufficient force against the center roller 4 to insure frictional rotation of the roller 4 when a withdrawal of the material is effected in the manner hereinafter described. Each point of the circumference of the roller 4, therefore, travels over a distance corresponding to the length of the piece of material withdrawn. This length is indicated at the sight openings or windows 13 in the casing of a measuring apparatus *m* constructed after the manner of an odometer and driven from the roller 4 by means of a train of wheels 12. When the apparatus is desired for use in warehouses it is sufficient to construct the measuring mechanism or devices to indicate only tens and units of meters as well as tenths and hundredths of a meter, that is to say, decimeters and centimeters, or yards and fractions of yards. To the plate 1 is also secured the apparatus for seizing the material, withdrawing it and rolling up the withdrawn lengths of material. This apparatus comprises a rotary drum 15 which can be driven either mechanically by driving mechanism capable of being wound up and released, see Fig. 19, or electrically, see Fig. 20, or by a hand-crank 16, see Figs. 1 and 2. A portion of the peripheral wall of the drum is made in the form of a flap 18 which can be turned about a hinge 17 and is normally held in a correspondingly shaped depression 20 in the body of the drum by a spring 19. On the free end of the flap 18 is mounted a gripper comprising two gripping jaws 21 ribbed on their adjacent faces and which are arranged to be closed by the pressure of a spring or can be pressed toward each other by a clamp capable of being easily released. After the upper hinged part 8 of the standard has been lifted up and turned back the flap 18 can be moved into the position shown in Fig. 1, in which position the loose end 10 of the material can be introduced between the jaws of the gripper 21, which for this purpose has its jaws opened by hand and afterward closed so that the material is clamped fast. If, after the loose end of the material has been clamped fast, the drum 15 be rotated in the direction of the arrow, Fig. 1, the gripper 21 draws the material with it and sets the measuring mechanism in motion by means of the roller 4 and the train of wheels 12. As the drum continues its rotation the flap 18 folds down into the depression 20 of the drum wall and the length of material as withdrawn is rolled up on the drum 15. The length of the piece of material which is at any time wound on the drum 15 can be read off or ascertained through the sight openings or windows 13 of the casing which exposes the readings of the measuring mechanism.

If the apparatus is also to serve for unrolling and cutting off a piece of material of a desired, predetermined length from the bale or roll of material, then the measuring mechanism is provided with a suitable arrangement for locking the movable parts thereof and also the rolling up drum when a piece of material of a length corresponding to that for which the apparatus is adjusted has been rolled up on the drum. The setting mechanism is effected by means of pointers 22 which are arranged on the front of the casing and are adapted to be worked by hand, to facilitate which they are furnished with suitable handles. The mechanism for cutting off the piece of material drawn off and rolled up on the drum 15 is arranged upon the upper part 8 of the standard, and as shown is worked by hand by means of a hand-lever 23 which is pivoted in bearings in a cross-piece 24 of the upper part 8 of the standard. Guided in the cross-piece 24 are two jaws 25 which are preferably connected to form a frame and which serve to clamp the material fast on both sides of a small transverse slot 26 provided in the plate 1. The two jaws 25 form a guide, and disposed to work therebetween is a cutting off knife 27 preferably formed with an oblique cutting edge. When the handle 23 is rotated in the direction of the arrow, Fig. 3, cam fingers 28 on the handle act upon the jaws 25 and force them, against the action of springs 29, see Figs. 2 and 3, in a downward direction, thus clamping the material fast, and at the same time another cam finger 30 on the handle acts upon the knife 27 and forces it, against the action of springs 27', into the transverse slot 26, whereby the piece of material held fast between the plate 1 and the jaws 25 is cut off. The actuation of the cutting mechanism may also be effected mechanically from the measuring apparatus or mechanism or from the rolling up drum, as will be hereinafter described. The disposition of the handle 23 and the cams 28 and 30 is of course immaterial. Fig. 2 shows the cams projecting toward the left and the handle 23 toward the right while Fig. 3 shows the cams projecting toward the right and the handle 23 toward the left.

For the purpose of enabling the piece of material rolled up on the drum 15 to be easily removed in its rolled up state, the greater part of the periphery of the drum is composed of separate segments 31 which diminish in width toward one side of the drum and each of which at one end is hingedly attached to the drum as at 32 and at its other end is connected to a corresponding movable splaying bar 33. The inner ends of the splaying bars 33 to which the segments 31 are connected are movable axially with reference to the drum 15; for example, they are hingedly connected to an axially movable sleeve 34, the adjustment of which can be effected by a knob 35 or the like. Immediately the sleeve 34 is drawn outwardly, all the segments 31 are set obliquely, as indicated by the broken lines in Fig. 4, so that the previously cylindrical drum for the greater part of its length is caused to assume a conical shape. The piece of material rolled up on the drum can, therefore, after loosening the gripper 21, which is accessible at one side of the drum, be easily removed, after which the drum can be again brought into its former cylindrical form by pushing the knob 35 inwardly, the said knob coöperating with the sleeve 34.

The measuring mechanism may be connected to or combined with mechanism for printing a checking strip or a coupon to be issued in a manner similar to that common in check tills. This mechanism may be operated by a presser 36 or a crank arranged to impress upon a strip or coupon 37 type corresponding to the adjustment for the time being or the length of the cut strip of material.

Figure 8:
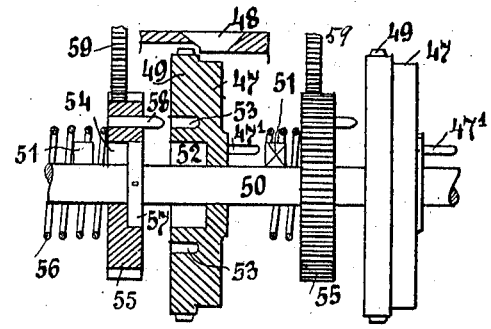

In the construction shown in Figs. 5 to 18, the material 10 is led, as in the arrangement shown in Figs. 1 to 4, over a series of three rollers 3, 4, 5, of which the center roller 4 rests in fixed bearings, while the two outer rollers 3 and 5 are carried in a frame 8 which is mounted to turn about fixed bearings 7 and can, therefore, be lifted up with the two rollers 3 and 5 for the purpose of enabling the loose end of the material to be inserted in the manner hereinbefore described. As in the construction hereinbefore described, the two rollers 3 and 5 are forced toward the central roller 4 by springs 9 acting upon the spindles thereof. The drum 15, which serves to draw off and roll up the material 10, is constructed in the same manner as the similar drum shown in Figs. 1 to 4, but in the present construction the expansion of the drum is automatically effected by movement of the frame 8. For this purpose there is fixed upon a short shaft 38, see Fig. 7ª, rigidly connected to the frame 8, a bevel wheel 39 which gears into a second bevel wheel 40 upon a vertical shaft on which is fixed an arm 41. The free end of the arm 41 carries a presser 42 which, when the frame 8 is lowered, forces outwardly the segments 31 at the expansible or free end of the drum 15, the said segments forming a portion of the drum periphery; in this way the drum is brought into cylindrical form and is effectively supported at its otherwise free end. When the frame 8 is raised, the presser 42 is moved away from the drum so that the segments 31, which are pivoted as at 32, move toward the shaft of the drum whereby the greater portion of the length of the drum becomes cone-shaped to facilitate the removal of the wound up piece of material. The movement imparted to the center roller 4 in the present construction, when the material is drawn through the series of rollers, is transmitted by the shaft 43 of this roller and bevel wheels 44 and toothed gears 45, 46, see Fig. 7, to the measuring and counting mechanism $m$. In the present construction the counting mechanism has three groups of counting wheels (for measuring centimeters, decimeters, and meters,) of which one group, that corresponding to the smallest unit of length (the centimeter) is driven directly from the center roller 4, while the other groups act in a manner similar to the operation of parts in this class of mechanism or as intermittently moved wheels, which, where the decimal system of measurement of length is employed, are moved forward one division after every revolution of the previous counting wheel. The counting mechanism is preferably constructed as shown after the manner of the ordinary letter lock, in which a group of slotted disks is so arranged as to allow the lock to be opened only when all the disks are positioned with their slots disposed in coinciding positions or in alinement. Each group of counting mechanism has a dial 47, the figures on which are visible at an opening 48, see Fig. 8, in the casing of the counting mechanism. Connected to, or in one piece with the dial 47 is a type wheel 49 which serves, as will be hereinafter explained, as a printing means coöperating with the checking strip. The type wheel 49 and dial 47 are loosely mounted on a rod 50 which, in addition to being movable to and fro longitudinally, is also rotatably supported and has a nose 51 for each group of counting mechanism and which corresponds to the key in a letter lock. The type wheel 49 is provided with a central depression 52, see Fig. 8, and around this depression it is formed with ten holes 53 arranged at equal distances from each other. Arranged between the nose 51 and the corresponding type wheel 49 and likewise loosely mounted on the rod 50 is a gear wheel 55 provided with a local slot 54 corresponding to a slotted disk in the letter lock. The slotted wheel 55 is pressed by a spring 56 continually against a ring 57 fast upon the rod 50 and carries a pin 58 which, when the slotted wheel 55 is pushed up to the type wheel 49, projects into one of the holes 53 and couples the slotted wheel to the type wheel. The apparatus being in position of rest, pin 58 of each wheel 55 faces that hole 53 of the wheel which corresponds to the "zero" figure of the dial wheel 47, this zero figure or cipher being visible through the register opening 48. This position of this part of the apparatus may be termed the "zero position." Into each slotted wheel 55 a toothed sector 59 normally gears, said sector rotating about a fixed shaft 60, see Figs. 6 and 7, and adapted to be manually turned or operated by a handle 61 preferably formed as a part of the sector and corresponding to the handle pointer 22 described in the first form of the mechanism and projecting from the casing of the counting mechanism. The office of the toothed sector 59 is to rotate the corresponding slotted wheel 55 and set its pin 58 opposite such hole 53 of the type wheel 49 corresponding to that figure of a fixed dial 61' (Fig. 6) of the casing adjacent to which the handle 61 is set. For the purpose of making an accurate adjustment of the slotted wheels 55, there is connected with each toothed sector 59 a smaller sector 59', Fig. 6, provided with ten notches into which engages a tooth on a spring 62. Each rotation of the sector 59' through one division, that is to say the distance between two successive notches, corresponds to one-tenth of the revolution of the slotted wheel. On coupling the slotted wheel 55 to the type wheel 49 the former is immediately thrown out of connection with the corresponding toothed sector 59, see Fig. 9, a finger 63, see Fig. 6, rotating about the shaft 60, first lifts the tooth spring 62 out of the small sector 59', after which a spring 64 previously stressed by the forward movement of the toothed sector 59 moves the toothed sector back again into its original position. As the dials or figure disks 47 of the counting mechanism are directly connected to the type wheels 49 for printing the checking strip, or are made in one piece therewith, the transmission of the tens, that is to say the shifting or rotative movement of a type wheel after each revolution of the type wheel of the previous group of counting mechanism, must be performed rapidly and only at the end of the last tenth of a revolution of the last named type wheel. For this purpose there is connected to each type wheel a stepped cam disk 65, see Figs. 15 and 15', which, as it rotates, gradually stresses a spring 67 connected to a ratchet lever 66 which is pivotally attached at 66$^x$ to a fixed part 66° of the mechanism. At the end of the tenth revolution step of the type wheel of one group the ratchet lever 66 clears the step of the disk 65 and the powerfully stressed spring 67, by means of a pawl 68 mounted on the end 66$^1$ of the ratchet lever 66, effects the rapid partial rotation of the ratchet wheel 69 belonging to the next group of counting mechanism and coupled to the type wheel thereof. By this partial rotation of the ratchet wheel 69 the figure wheel 47 and type wheel 49 of this next group are partially shifted by one division or one figure or type. When any indefinite length of a piece of material is to be measured off by means of the apparatus, the cutting mechanism is not used and all the slotted wheels 55 remain in their initial or zero position out of use and are held therein by the rings 57 of the rod 50 which remains in the intermediate position shown in Fig. 8 during the proper measuring operation. In this case the rod 50 having moved to the right to the intermediate position shown in Fig. 8 is retained, for instance by a lever $a$ (Figs. 21, 22) the arm $a°$ of which can be introduced by hand in a circular groove $b$ of the rod 50 in the manner hereinafter described. This groove allows the endwise movement of the rod 50 from the position (Fig. 8) only to the left into the extreme left-hand position for the purpose of setting the counting mechanism to zero after each counting or measuring operation. The counting mechanism acts in this case like an ordinary odometer and indicates the length of the piece of material drawn at any time through the series of rollers. The slotted wheels 55 are brought into operation in cases where a piece of material of any desired or predetermined length is to be drawn off from the bale of material. For this purpose the slotted wheels are first set by means of the adjusting sectors 59 to the number of the fixed dial 61$^1$ corresponding to this length, that is to say, they are turned back in the opposite direction to the direction of working rotation of the type wheels and through an angle or by so many tenths of their complete revolution corresponding to the number to which they are to be set or adjusted.

Figure 9:
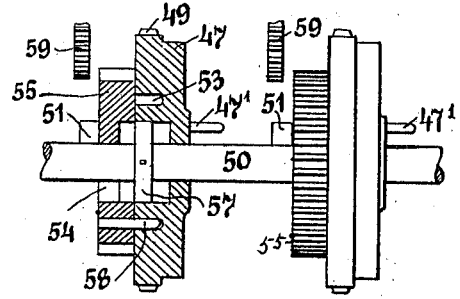
Figure 10:
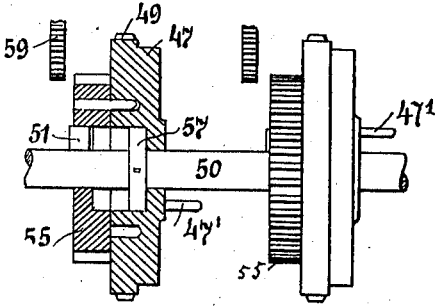

In Figs. 8 to 11, it is assumed in the left-hand group of counting mechanism that the slotted wheel is set at "5" so as to stop the machine when in this example 50 yards are measured, that is to say, this wheel has been turned through 180° so that the slot 54, which was previously at the top, Fig. 8, when the register indicates "zero" is now at the bottom, Fig. 9. The nose rod 50 is then shifted toward the right, Fig. 9, by releasing the right-hand end of the rod 50 and under the action of a spring 70, as will be hereinafter described, so that all the slotted wheels 55 are coupled to the corresponding type wheels 49 and the noses 51 of the rod 50 bear against the corresponding respective slotted wheels. The drawing of the material through the series of rollers now takes place, the dial and figure wheels acting as before, but the slotted wheels 55 advancing, i. e. rotating, with the type wheels 49. The instant a piece of material of predetermined length has passed through the series of rollers, the slots 54 of the slotted wheels will, in consequence of the above described previous adjustment of the latter, be brought into line and in line with the noses 51 of the rod 50, which during this time has been prevented from rotating, for instance by a lateral projection 50¹ (Fig. 15¹) engaging a slot 50² in a standard 50³, so that the rod is pushed to the right by the spring 70 acting upon its left-hand end, see Figs. 5 to 7, the noses 51 then entering the slots 54, Fig. 10. The counting mechanism is now blocked and the length of the piece of material drawn through is visible at the windows 48 in the casing opposite the dials 47. In consequence of the blocking of the counting mechanism the central roller 4 can no longer be rotated. Simultaneously with the blocking of the counting mechanism the winding up drum 15 is thrown out of gear with the driving shaft 71 actuated by a hand crank, so that no further winding up can take place. For this purpose there is inserted between the driving shaft 71 and the drum shaft 72 a clutch, the movable half 73 of which can be thrown into or out of gear with the other half 76, which is attached to the drum shaft, by means of a lever 75 pivoted at 74. The second arm of the lever 75 is provided with a pin 76¹ which enters a curved groove 77 in a sector piece 78 rigidly connected to a blocking arm 79 and therewith fixedly mounted upon a rotary shaft 80. The shaft 80 is so acted upon by a spring 81 that the blocking arm 79 tends to move downward. When the blocking arm 79 is raised, the spring 81 is stressed and the pin 76¹ is located in the left-hand end portion of the curved groove 77 of the sector, the shaft 72 of the drum being coupled to the driving shaft 71, Fig. 7. During the measuring, that is to say, as long as the counting mechanism is at work, the blocking arm 79 is held in this raised position by a supporting pin 82 projecting laterally from the nose rod 50. By the movement of the nose rod 50 toward the right, which takes place when the measuring is over, the blocking arm 79 has its support withdrawn so that it drops down and by means of the curved grooved sector piece 78 and the lever 75 throws the drum shaft 72 or the drum 15 itself out of action. After each measuring operation the counting mechanism must again be set back to "zero" to permit a new measuring operation. In the construction shown this is effected automatically by the nose rod 50, which for this purpose is first brought into its extreme left hand position, Fig. 11, and then rotated, by which movement each nose 51 is first moved into the path of a pin 47' on the type wheel and dial 47, 49 of the previous group, so that on rotation of the rod these wheels will be carried with it and turned back into the zero position. The movement of the rod 50 into the extreme left-hand position and the rotation of this rod are effected by a cam device operated by the frame 8 being moved upward after the measuring operation, as will be hereinafter fully described. For the first group of counting mechanism wheels a special nose 51 must be provided on the rod 50, which nose, however, serves exclusively and only for returning the type wheel of this group into the zero position. All the previously described longitudinal movements of the nose rod, as well as the rotation thereof, are effected by lowering and raising the frame 8 which carries the removable rollers 3 and 5. For this purpose the rotary movement of the frame 8 or the frame shaft 38 is transmitted to the operating device, hereinafter described, by a device, such for example, as a chain drive 83 as shown (Figs. 7 and 7ª).

84 is a shaft which is rotated backward and forward by the chain drive 83 when the frame 8 is raised and lowered, Figs. 7, 17 and 18; and 85 is a ratchet lever fixed upon such shaft. A spring pawl 86 of the lever 85 is arranged to slide idly over the teeth of a ratchet wheel 87 loosely mounted upon the shaft 84 when the frame 8 moves downward, but on the upward movement of the frame 8 the pawl 86 engages the teeth of the wheel 87 so that this wheel is caused to rotate. The extent of this rotation is determined by a rigidly fixed engaging guide 88 beveled off at one end and a disengaging guide 89 likewise beveled off at one end and which rests upon a normally fixed ring 90. The pawl 86 is provided with a lateral extension 86' which at the commencement of the upward movement of the frame 8 runs upon the engaging guide 88 and holds the pawl out of action until the extension 86' drops off the beveled end of such guide and onto the smooth ring 90 whereby the pawl is thrown into gear with the ratchet wheel 87 by its spring. Just before the completion of the stroke of the pawl 86 or the upward movement of the frame 8 the extension 86' runs up the beveled end of and onto the disengaging guide 89 whereby the pawl is lifted out from engagement with the ratchet teeth and the ratchet lever 85, without carrying the ratchet wheel 87 with it, moves still farther on to the end of its stroke.

The ratchet wheel 87 is connected to a tubular shaft 91 rotating loosely on the shaft 84 and upon which is fixed a toothed wheel 92 which gears into a wheel 93 fast upon the nose rod 50 of the counting mechanism. The wheel 93 is of such width that it remains in engagement with the toothed wheel 92 irrespective of how the nose rod 50 may be shifted in the direction of its length and the toothed wheels 92, 93 effect the rotation of the nose rod 50 for the purpose of returning the counting mechanism to its zero position. This setting back of the counting mechanism takes place in the time during which the ratchet pawl 86 is moving from the engaging guide 88 to the disengaging guide 89 and wherein the pawl rotates the ratchet wheel and consequently the toothed wheel 92.

Figure 11:
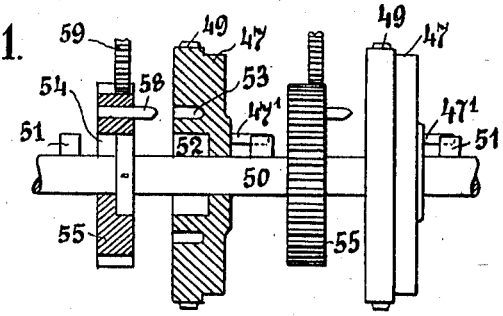

As hereinbefore described, in cases where the apparatus is used for drawing off pieces of material of previously determined length, the nose rod 50 of the counting mechanism is moved to the right prior to measuring, that is to say, before the counting mechanism is started, Fig. 9, for the purpose of coupling the slotted wheels 55 to the type wheels 49, but after the measuring has taken place the said rod is brought into the extreme left-hand position, Fig. 11, to enable the counting mechanism to be brought back into the zero position. After being rotated the nose rod must then be again shifted a short distance toward the right and brought back into the original position, Fig. 8, to permit a fresh measurement to be made. The shifting of the nose rod toward the right after the setting but before the measuring takes place is effected on the lowering of the frame 8, whereas all other movements of the nose bar must take place on the raising of the frame after the measuring has been done. For this reason, provided the movement of the frame in the two directions is not converted directly by ordinary turning or reversing gear into one in the same direction, a cam plate with two different cam faces or operating parts must be employed, one operating part coming into operation on the lowering of the frame and the second operating part coming into action on the raising of the frame.

In the present case a complicated arrangement of a turning or reversing gear for the frame shaft 38 is avoided by the use of a two stepped cam disk 94 which is operated by the ratchet lever 85 of the ratchet gear, the said lever being directly connected to the disk 94. The cam disk 94 is loosely mounted on the tubular shaft 91, and upon a cylindrical portion of the cam disk 94 is loosely mounted the before-mentioned ring 90 which carries the disengaging guide 89. The face of the disk 94 farthest away from the ratchet wheel 87 forms two operative or cam faces 95 and 96, the cam face 96 projecting farther from the side of the cam disk 94 than the part 95 and which cam faces act alternately by means of an intermediate device described in detail in the following paragraph upon a shifting arm 97, the rotary supporting shaft 99 of which is carried in fixed bearings 98 and which shaft is also provided with a second arm 100 arranged to act upon the end of the nose rod 50.

The shifting arm 97 is pressed by a spring 101 toward the cam disk 94, and on the side thereof facing the disk the arm carries a switch lever 103 arranged to be rotated perpendicularly to the plane of rotation of the shifting arm 97 about a pivot 102, Fig. 16. The switch lever is furnished with a pin 104 which, according to the position of the switch lever 103, bears upon one or the other cam face or operative part 95 or 96. On the other side the switch lever 103 carries a pin 105 which enters a slot 106 in the shifting arm 97, the rotation of the switch lever being thereby limited in both directions.

The shaft 84, which is moved to and fro by the frame 8, also actuates, in the example under notice, mechanism which feeds forward, for a given distance before each measurement, a paper strip unwound from a roll, cuts it off, then prints the number corresponding to the length of the piece of material drawn off upon the cut off piece, checking strip, or coupon, and throws it out. As the advance or feeding of the strip must always take place in one direction, the to-and-fro movement of the shaft 84 must be transmitted to the feeding mechanism always in the same direction by means of a turning or reversing gear. This turning or reversing gear consists of two toothed wheels 107 and 108 loosely mounted upon the shaft 84 and which are each rigidly connected to a tappet wheel 109 and 110, respectively, Fig. 7, and which need have only one tooth. The tooth of the one tappet wheel is, however, set in the opposite direction to that of the other wheel. Upon the shaft 84 are also mounted two tappet disks or arms, each carrying a spring tappet pawl 111, 112, which alternately carry with them first one and then the other of the wheels 109 and 110. In each of the two toothed wheels 107 and 108 gears a broader toothed wheel 113 and 114, respectively, and these latter in turn engage with one another, see Fig. 13. On the rotation of the shaft 84 in one direction, one of the pawls 111 or 112 carries the corresponding toothed wheel 107 or 108 with it, and on the rotation of the shaft 84 in the opposite direction the other pawl carries its corresponding toothed wheel with it, so that the broader wheels 113 and 114 always rotate in the same direction. One of these wheels, namely, the wheel 113, transmits movement to a toothed wheel 115, see Figs. 12, 13, which, by means of two pins 116, operates the jaws 117 of a pair of shears for severing the checking strip 118'. The movement of the toothed wheel 115 is transmitted by wheels 120, 121, to a transverse shaft 122, Figs. 12, 13, which carries two milled or corrugated wheels 123 that grip the paper strip 118 between them and a guide roller 124 and feed it forward when the transverse shaft 122 rotates. The transmitting wheel 120 driven by the turning or reversing gear 107, 114, is only partially toothed as the pushing forward of the paper strip has only to take place during a portion of the downward movement of the frame 8. The piece 118' of the paper strip 118 thrust forward each time is if required led through a guide 125, Fig. 5, onto a printing platen 127 provided with an india rubber inlay 126, Fig. 14, and immediately afterward severed from the strip 118. By means of two pins 128 arranged near one end of the platen the printing platen 127 is rotatably held and during the advance of the strip the platen is held in a horizontal position by a supporting roller 130 which is mounted on an arm 132 rotating about a bar 131, Figs. 12 and 14. The arm 132 is connected by a link 133 to a rotating lever 134 furnished with a pin or a bowl 135 that rests upon a cam 136 fast upon the shaft 84. As long as the pin or bowl 135 runs upon a concentric part of the cam 136, the supporting roller 130 holds the printing platen 127 in a horizontal position; immediately, however, that the pin or bowl 135 runs onto a raised portion or finger 136' of the cam 136, the platen 127 is raised and the piece 118', already cut off from the paper strip 118 and lying upon the platen, is pressed against the type wheels 49, and the type, which at this particular time are underneath and which correspond with the figures visible at the sight holes, are thereby caused to print on the strip part 118'. The type wheels 49 are inked in the usual way, or an inked ribbon may be passed in the usual way between the platen 127 and the type wheels. Immediately that the pin or bowl 135 runs off the finger 136' and runs onto the inner portion of the cam disk 136, the supporting roller 130 descends, and the platen 127 turns downwardly about the pins 128, as shown in Fig. 5 by dash and dot lines, so that the printed checking strip 118' slides down the sloping platen and falls out.

The working of the entire apparatus will now be described in a case where a piece of material of predetermined length is to be drawn off from the bale of material.

When the frame 8 is lifted up, the material 10 is laid with its loose end over the roller 4 and introduced into the gripper 21 of the flap 18 of the winding up drum 15. After this the counting mechanism is set to the length of the piece of material to be drawn off by turning back the slotted wheels 55 by means of the setting sectors 59. When the frame 8 is in raised position the ratchet lever 85 is in the upper position I, Fig. 18, the pin 104 of the switch lever 103 engaging a depression 137 of the maximum projecting operative part 96 of the cam disk 94. The nose rod 50 of the counting mechanism is now in the normal position, see Fig. 8. The frame 8 is now lowered. During this movement the pin 104 is moved outwardly by a sloping face 138 adjoining the depression 137, see Figs. 18 and 24, the switch lever 103 being thus rocked from the position A into position B (Fig. 16) and the pin 104 arriving at the circumferential edge of the part 94 falls onto the minimum projecting part 95 of the cam disk under the action of the spring 101 acting upon the shifting arm 97. By this means the nose rod 50 is moved to the right under the pressure of the spring 70 and the coupling of the slotted wheels 55 to the type wheels effected. The pin 104 now runs upon the zone 95 during the rotation of the cam disk in the direction of the arrow $q$ brought about by the downwardly moving frame 8. Before the close of this rotation the pin 104 enters a depression 139 in the part 95 which causes the arm 100 connected to the shifting arm 97 to rise slightly from the right hand end of the nose rod 50 in order to allow, at the proper time, further movement of the nose rod to the right, this being the movement that takes place at the end of the measuring operation. The hammerlike shaped blocking arm 79, hereinbefore mentioned, rests upon the pin 82 of the nose bar 50 and holds the shaft 72 of the winding up drum 15 (at this time held in cylindrical form by the presser 42) coupled to the driving shaft 71. During the downward movement of the frame 8 there also takes place the advance of the paper strip 118 and immediately afterward the cutting off of the piece 118' of the strip which is thrust forward but is not yet printed. The material is then wound up upon the drum 15. Immediately a piece the length of which corresponds to the length for which the counting mechanism is set, is drawn off from the material; the slots 54 in all the wheels 55 are in line with the noses 51 by reason of the preadjustment of the wheels 55; the nose rod, the right hand end of which is clear of the arm 100, is brought as before described into the right hand end position by the spring 70, the noses 51 entering the alined slots 54 in the wheels 55. The counting mechanism is now locked and the winding up drum 15 is thrown out of action by withdrawing the pin 82 from under the blocking arm 79 so that the latter falls down. On the conclusion of the downward movement of the frame 8 an inclined bar or arm 140 on the cam disk 94 acts upon the pin 104 so that it is moved inwardly into the depression 141 in the part 96. By the downward movement of the frame 8 the switch lever 85 is brought into the second end position II by means of the chain drive 83.

The severing of the wound up piece of material may be effected either by hand, in which case the before described cutting off mechanism can be attached to the frame 8, or mechanically from the measuring apparatus or from the rolling up drum.

Fig. 25 illustrates an arrangement for mechanically severing the wound up piece of material. The cutter 27, movable between the two jaws 25, is provided (as can be seen also from the dashed line in Fig. 3) with a slanting cutting edge, this arrangement being advantageous and generally used in cutting devices of similar nature. The cutter 27 is connected, by means of links $g'$ at two places suitably distanced from each other, with bell crank levers $w$ that are hinged in bearings supported by the jaws 25. The downwardly directed arms of the bell crank levers $w$ are connected by means of the connecting rod $s$ with each other and also with the pin of a crank $k$ keyed upon the shaft of a toothed wheel $z^2$ meshing with a second wheel $z^1$ which is actuated by a chain drive $83^\times$ from the counting mechanism or from the rolling up drum. In cases where the main chain drive 83 (Fig. 7) serves to actuate the shaft 38 of the frame 8, with the object of automatically raising and lowering this frame, the said chain drive 83 may operate the wheel $z^1$. In all cases the described parts are so arranged that the cutter 27 actuated by the chain $83^\times$ or 83 will perform the cutting operation as soon as a certain length of material for which the counting mechanism has been preadjusted will have passed through the roller system. After the separation of the wound up piece of material the frame 8 is again raised, the switch lever moved out of the second end position II, Fig. 18, in the direction of the arrow $g^2$, the strip portion 118' printed and immediately afterward thrown out.

During the rotation of the cam disk 94 in the direction of the arrow $g^2$ the pin 104 first runs upon an inclined face 142 adjoining the depression 141, see Fig. 18, and is thereby guided onto the maximum projecting part 96 of the cam disk. By this means the nose rod 50 is brought into the left hand end position. On the further rotation of the cam disk 94 the pawl 86 of the ratchet lever 85 runs off the end slope of the engaging guide 88, so that the pawl enters into engagement with the ratchet wheel 87 and consequently rotates it; the nose rod 50 being set in rotation by the previously described operation bringing back the counting mechanism and the type wheels thereof into their zero position. On the upward movement of the frame 8 the presser 42 simultaneously moves from the winding up drum 15 whereby the shape of the latter is altered from cylindrical to cone shape and the removal of the piece of material which has been previously released from the gripper 21 of the drum 15 is facilitated. Before the end of the upward movement of the frame 8 the pin 104 of the switch lever 103 again moves into the depression 137 of the disk 94 whereby the nose rod 50 is moved back again into the starting position, Fig. 8, so that the apparatus is once more ready for use.

Let it be assumed that the wound up part of the material is cut off along the line 143—143, Fig. 7, which coincides with the center of the cutting off groove 26. The parts are so arranged that when the flap 18, Fig. 5, is open its gripper 21 can grasp the loose end of the material above the cut off groove 26, as shown in Fig. 5 by dotted lines. As, therefore, in this case the material is grasped at that point on the table 1 at which the cutting off subsequently takes place, the piece of material 145 lying between the line 143 and the tangent 144 of the two rollers 4 and 5 does not come into account when drawing off and cutting off pieces of material of predetermined length. It will therefore be understood that if courses of material are to be measured off from a bale or roll, that is to say, their length is to be determined, the counting mechanism would in the absence of any remedial provision, after the complete passage of the material through the system of rollers, indicate too little by the length of the piece 145 for the material when inserted in the apparatus projects beyond the tangent 144 to the extent of the piece 145 which exerts no influence upon the counting mechanism. In order, however, that the counting mechanism shall indicate the correct length of the material passed through the apparatus, the counting mechanism is not set back entirely to zero, but is set forward an amount corresponding to the length of the piece 145 before commencing to pull the material through the apparatus and so measure the length thereof. As the setting back of the counting mechanism to zero takes place during the movement of the ratchet pawl 86 from the engaging guide 88 to the disengaging guide 89, the latter must be adjustable about an arc corresponding to the length of this piece 145. For this reason the carrier ring 90 of the disengaging guide 89 is rotatable through this arc and carries a handle 146, which according to the position of the ring 90 can be placed in one or other of two notches 147, 148 in a fixed standard 149 for the purpose of holding the ring 90 and the disengaging guide 89 in the position they occupy for the time being. When pieces of material of predetermined length are to be drawn off, rolled up and cut off, the handle 146 (Fig. 18) is placed in the upper notch 147, so that the disengaging guide 89 is in the position shown by full lines; when measuring indeterminate courses of material the handle is placed in the lower notch 148 and the disengaging guide 89 assumes the position indicated by dotted lines. As the piece 145 is only of short length the setting forward of the counting mechanism as hereinbefore described, when measuring off pieces of material of indefinite length, extends only to the type wheel of the lowest unit stage, for which purpose the setting back pin 47' of this wheel is somewhat longer than those of the type wheels of the higher unit stages, and there is also provided in the maximum projecting part 96 of the cam disk 94 a depression 150, Figs. 17 and 18, which, before the end of the upward movement of the frame 8, allows the nose rod 50 to move a short distance to the right, the type wheels of the higher unit stage, which have already reached the zero position, being released from the nose rod, while the type wheel of the lowest unit stage with its somewhat longer pin 47' still remains within the reach of the corresponding nose 51 on the bar until the pin 104 falls into the deeper recess 137 at which instant the last mentioned type wheel is released from the nose rod.

When measuring off indeterminate courses of material the nose rod must be prevented from moving completely to the right, so that no coupling of the slotted wheels (which are to be thrown out of action in this case) with the type wheels can be effected; the shifting of the nose rod into the left hand end position, see Fig. 11, and into the normal position, see Fig. 8, must, however, be possible in order to enable the counting mechanism to be brought back into the zero position after the measuring is ended, that is to say, when the frame 8 is raised. This limiting of the course of the nose bar is obtained, for instance, by means of the revolving ring 90, this ring having a cam projection C (Fig. 21) which acts on the lever $a$ (Fig. 21) so as to introduce the arm $a^0$ of this lever into the groove $b$ of the nose rod 50, when the ring 90 is rotated in one direction. A spring $a^1$ may be provided to withdraw the end of lever $a$ from the groove $b$.

For the purpose of preventing the winding up drum from acting upon the material by traction through the *vis viva* after it has been disconnected from the driving shaft, a device may be provided for putting a brake on the winding up drum before it is thrown out of action, such device being worked off the counting mechanism. The transmission of the brake action to the shaft of the winding up drum may be effected by means of toothed wheels 151, 152, Fig. 7; as, however, the brake apparatus forms no part of the present invention and may be of any known construction it is not shown or described.

Having thus described the invention, what is claimed as new, is:

1. In a machine of the class specified, a rolling up drum, a counting apparatus comprising a number of groups of elements, each group consisting of a counting wheel operated by a ratchet device, a plurality of rollers, one roller being held in fixed bearings, and other two rollers arranged on each side of the fixed roller and normally in contact with this fixed roller, this latter roller being connected to the counting apparatus and the other rollers being supported by a movable frame carrying a cutting off mechanism and capable of being raised with the latter in such manner that the material drawn off from a roll or bale of material can be easily inserted in the machine and brought into engagement with the rolling up drum.

2. In a machine of the class specified, a rolling up drum, a counting mechanism comprising a number of groups of elements, each group consisting of a counting wheel operated by a ratchet device, three rollers for guiding material to be measured, one roller being held in fixed bearings and operatively connected to the counting mechanism, and the other two arranged on either side of the one roller and having spring means engaging the said two rollers to press them toward the center of the said fixed roller, a hinged roller-supporting frame for the said two rollers and operative to dispose the said rollers in such position that the loose end of the material to be cut and measured can be inserted between the fixed roller and the movable rollers, and a cutting off mechanism arranged in front of the rolling up drum and carried by the hinged supporting frame.

3. In a machine of the class specified, a drawing off and winding mechanism for the material, consisting of a rotatable cylindrical drum having a peripheral hinged portion provided with an easily releasable gripper for holding the loose end of the material, and also having peripheral movable pieces, and means operable to provide for the disposition of said pieces in the form of a cylinder during the winding operation and in the form of the frustum of a cone subsequent to the winding operation in order that after a piece of material has been rolled up, cut off and released from the gripper, the rolled up piece of material may be easily thrown off the drum.

4. In a machine of the class described, a drawing off and winding mechanism including a plurality of rollers, a rolling up drum, a standard or frame having a movably mounted upper part which carries a portion of the rollers and a pivot axle for the said movable upper part of the standard or frame, a counting mechanism, a movable member coöperating with said mechanism to provide for or to block its action, connections between said axle and the movable member whereby the movements of the latter are controlled by and consequent to the movements of the former, means for setting the counting mechanism to designate a predetermined length of material, means for operating the movable member to block the counting mechanism when this length of material is drawn off from its bale and passed through the rollers, and means included in said operative connections for causing an operation of the member to restore the counting mechanism to zero position.

5. In a machine of the class specified, a rolling up drum having segments, a frame arranged to be raised and lowered and carrying movable rollers, a shaft which is turned when the frame is raised or lowered, a presser coupled to the shaft and arranged to force the segments outwardly when the roller carrying frame is lowered, and spring means coöperating with the segments and arranged to move the segments inwardly, when the presser moved by the rising frame releases the segments, for the purpose of causing the greater portion of the winding drum to assume a conical shape to facilitate the removal of the wound up piece of material therefrom.

6. In an apparatus of the type set forth, a winding-up drum, a frame arranged to be raised and lowered and carrying a plurality of rollers, a stationary roller arranged to coöperate with the first-named rollers in feeding a sheet of material, a cutting off mechanism located between the rollers and the winding-up drum, a drum shaft, and counting mechanism capable of being set to designate the desired length of the piece of material to be drawn off and comprising type wheels and dials, slotted wheels and a nose rod, the latter being operable when the frame is lowered to couple the previously set slotted wheel to the type wheels and dials of the counting mechanism and to block the latter when a piece of material of predetermined length is passed through the rollers, an intermittently driven ratchet device actuated by the frame shaft, transmission gearing between the ratchet device and the nose rod to operate the latter for the purpose of setting the counting mechanism to zero position when the frame is raised, and means driven by one of the aforesaid rollers for operating the counting mechanism.

7. In an apparatus of the type set forth, a winding-up drum, a frame arranged to be raised and lowered and carrying a cut-off mechanism, a frame shaft, a ratchet and pawl device operated thereby, a counting mechanism including a nose rod which is rotated from the ratchet and pawl device when the frame is raised to set the counting mechanism in a zero position, shifting means for the nose rod and the counting mechanism, the nose rod being shiftable in the direction of its length, and a cam disk means operated by the ratchet and pawl device to control the shifting movements of the nose rod.

8. In an apparatus of the type set forth, a winding-up drum having a shaft, a driving shaft for the shaft of the winding-up drum, a clutch to operatively connect the driving shaft and the driven shaft, an engaging and disengaging device for the clutch embodying a movable shifting element and clutch engaging means operated thereby, a counting mechanism including a counting device and a nose rod shiftable to block the counting mechanism and engageable by said movable shifting element, the said movable shifting element bearing upon the nose rod as long as the counting device is working but becoming disengaged from said nose rod when the latter is shifted for the purpose of blocking the counting device and when so disengaged having movement to effect the operation of the clutch engaging means whereby the clutch is thrown out of action and the winding-up drum put out of operation.

9. In a machine of the class specified, the combination with a counting mechanism, of a frame and a frame shaft, a device for automatically feeding forward at intervals a checking strip upon which are to be indicated the numbers corresponding to the length of the piece of material to be rolled up, said device consisting of gripper wheels or rollers arranged to grip the checking strip between them and including in its organization suitable frame shaft driven gearing, by means of which the gripper wheels or rollers are caused to intermittently rotate in the same direction, a pin disk arranged to be operated by the said gearing, and shears operated by the pin disk to cut off the checking strip after the latter has been fed forward.

10. In a machine of the class specified, the combination with a winding up drum, a cutting off mechanism located in advance of said drum, a counting and measuring mechanism comprising a number of type wheels, a group of rollers actuated by the material to be measured and located in advance of the cutting off mechanism, one of which rollers is suitably coupled to the adjacent or first type wheel of said counting and measuring mechanism, of a driven shaft, mechanism for printing and drawing out a checking strip including a platen adapted to be tilted and raised and lowered, and gearing driven from said shaft and operable to effect the raising and lowering movements of the platen, the latter holding the strip underneath the type wheels of the printing mechanism and being first lifted to press the strip against the type wheels and then lowered to permit the said strip to fall off, a movable frame by which certain of the rollers are carried, and connections between said frame and the driven shaft whereby the latter is operated consequent to the movement of the former.

11. An apparatus of the type set forth, including a series of rolls over which material is drawn, a displaceable frame part by the position of which access to the rolls may be had or prevented, counting mechanism including a zero setting device, gearing to operate the counting mechanism from one of the rolls and means operated by the frame part during a movement thereof to effect an operation of the zero setting device.

12. An apparatus of the type set forth including a series of rolls over which material is drawn, a displaceable frame part by the position of which the rolls are disposed in a common plane or in different planes, a counting mechanism driven from one of the rolls, means for setting the counting mechanism with reference to a predetermined indication, means for automatically blocking said mechanism when it registers the predetermined indication, and means operable by the displaceable frame part during a movement thereof to reset the last-named means.

13. An apparatus of the type set forth, including a series of rolls over which material is drawn, a displaceable frame part by the position of which the rolls are disposed in a common plane or in different planes, a counting mechanism driven from one of the rolls, means for setting the counting mechanism with reference to a predetermined indication, means having the successive functions of automatically blocking the mechanism when it registers the predetermined indication and of resetting the mechanism to zero, means for operating the second-named means in the blocking operation, and means operable by a movement of the displaceable frame part for operating said second-named means in the counter mechanism resetting operation.

14. An apparatus of the type set forth, including a series of rolls over which material is drawn, a displaceable frame part by the position of which access to the rolls may be had or prevented, a counting mechanism driven by one of the rolls, a shaft which is operated intermittently and alternately in opposite directions by the frame part by the movements thereof, a system of gearing intermittently driven in the same direction by said shaft, a second shaft driven in one direction only by said gearing, a coupon feeding device, connections for intermittently operating said feeding device from the second shaft, a coupon cutting device, connections for intermittently operating the cutting device from said second shaft during the intervals of idleness of the feeding device, and means for printing on the cut coupon a reading corresponding to the indication of the counting device.

15. An apparatus of the type set forth, comprising a roll over which material is drawn, and a counting device including a group of dial wheels driven from the roll, a slotted wheel for each dial wheel, means for setting each slotted wheel to a determined position with relation to its dial wheel, devices to couple the slotted wheels and the corresponding dial wheels, a rod having projections to engage in the slots of the slotted wheels, and means for automatically moving the rod when the slots come into alinement with the projections on the rod.

In testimony whereof I have hereunto set my hand in presence of two subscribing witnesses.

EMIL ZIPPER.

Witnesses:
JOSEF RUBASCH,
ALVESTO S. HOGUE.

---

Copies of this patent may be obtained for five cents each, by addressing the "Commissioner of Patents, Washington, D. C."